United States Patent [19]

Chirnomas

[11] Patent Number: 5,027,698

[45] Date of Patent: Jul. 2, 1991

[54] ICE CREAM VENDING MACHINE

[76] Inventor: Munroe Chirnomas, 336 2nd St., Dunellen, N.J. 08812

[21] Appl. No.: 482,261

[22] Filed: Feb. 20, 1990

[51] Int. Cl.⁵ .......................... A23G 9/00; B65B 39/14
[52] U.S. Cl. .................................... 99/450.1; 99/451; 99/455; 99/484; 99/486; 99/494; 141/98; 141/104; 221/93; 221/96; 221/150 HC; 222/146.1
[58] Field of Search .................. 99/450.1, 452–453, 99/455, 484, 485, 486, 483, 494, 451, 517, DIG. 14; 141/11, 98, 104; 221/93, 96, 150 R, 150 HC, 150 A; 222/146.1, 146.2, 146.6; 118/16, 20, 23; 62/331, 382; 219/10, 55 R

[56] References Cited

U.S. PATENT DOCUMENTS

| | | | |
|---|---|---|---|
| 949,647 | 2/1910 | Colbert | 193/44 |
| 2,093,410 | 9/1937 | Boon | 221/113 |
| 2,253,482 | 8/1941 | Forsthoefel et al. | 221/14 |
| 2,304,484 | 12/1942 | Smith | 221/124 |
| 2,385,465 | 9/1945 | Phelan | 194/296 |
| 2,442,025 | 5/1948 | Smith | 193/45 |
| 3,748,437 | 7/1973 | Keeshin et al. | 99/483 |
| 3,794,219 | 2/1974 | Pitel et al. | 222/108 |
| 3,874,189 | 4/1975 | Calim | 222/406 |
| 3,876,110 | 4/1975 | Logie | 222/146.1 |
| 3,954,126 | 5/1976 | Piana | 141/104 |
| 4,009,740 | 3/1977 | Michielli | 141/174 |
| 4,174,742 | 11/1979 | Murphey | 141/11 |
| 4,232,798 | 11/1980 | Hammel et al. | 221/96 |
| 4,458,801 | 7/1984 | Nichols | 193/46 |
| 4,645,093 | 2/1987 | Jones | 221/93 |
| 4,671,425 | 6/1987 | Knoll | 221/150 HC |
| 4,793,279 | 12/1988 | Grenier | 118/16 |
| 4,931,202 | 4/1990 | Miller et al. | 141/104 |
| 4,942,910 | 7/1990 | Hamamura | 141/11 |

Primary Examiner—Timothy F. Simone
Attorney, Agent, or Firm—Ralph W. Selitto, Jr.

[57] ABSTRACT

A vending machine stores a plurality of cups that are filled with primary food products and sealed with covers, and on command, dispenses one cup from the plurality of cups, removes the cover from the one cup, and adds secondary food products to the primary food product in the one cup. The primary food product can be heated. The operation of the vending operation is automatically controlled.

36 Claims, 11 Drawing Sheets

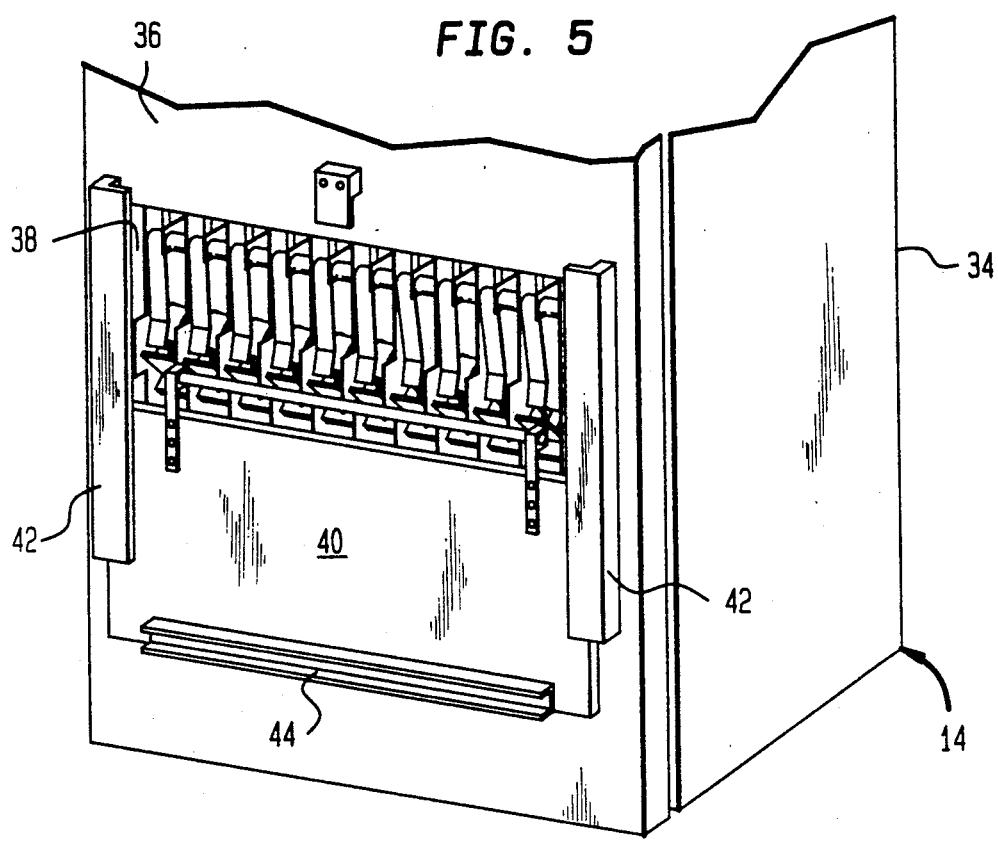
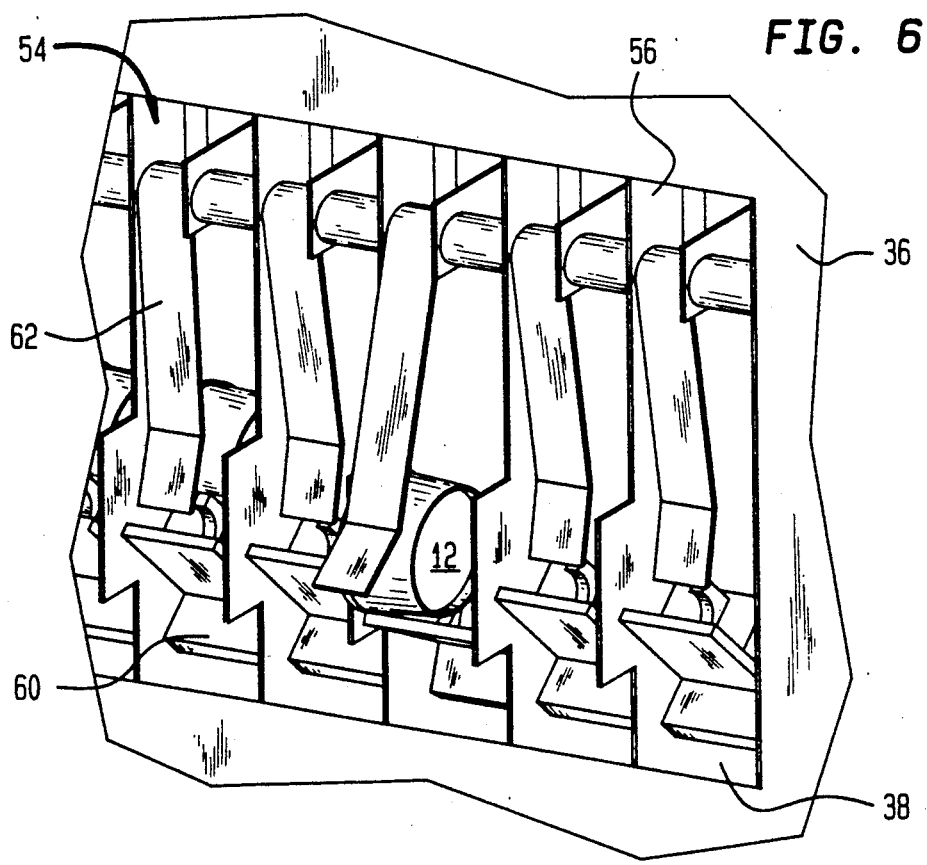

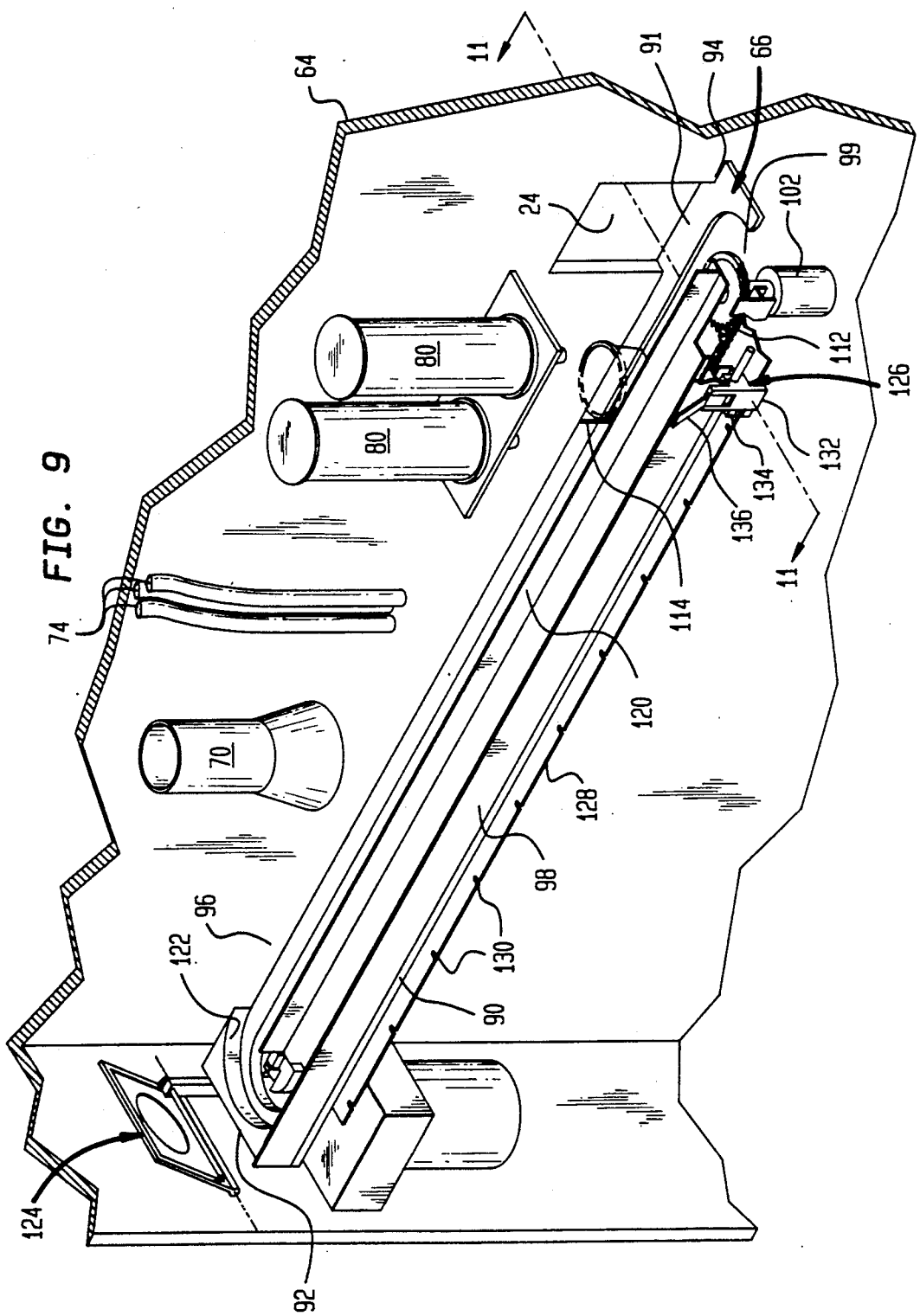

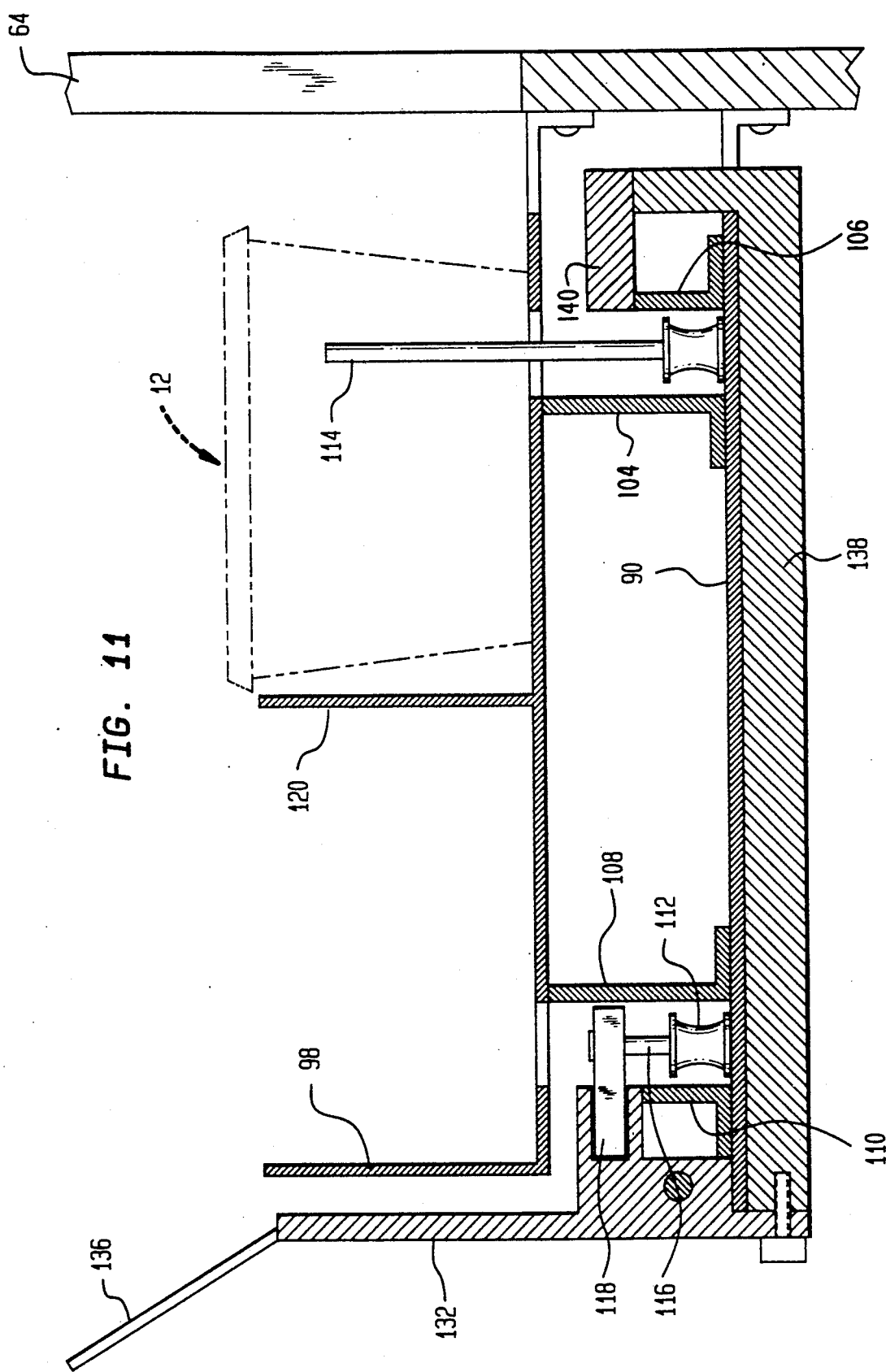

ICE CREAM VENDING MACHINE

FIELD OF THE INVENTION

The present invention relates to vending machines, and, more particularly, to a vending machine that automatically dispenses a pre-packaged cup of ice cream, uncovers the cup and adds toppings onto the ice cream.

BACKGROUND OF THE INVENTION

Throughout the years, ice cream parlors have enjoyed far greater success at selling ice cream than have been vending machines. The reasons are simple: quality and variety. At an ice cream parlor, a customer can buy a cup of ice cream, dripping with hot fudge, sprinkled with nuts and smothered with whipped cream. From the vending machine, the customer can only buy a cup of frozen ice cream. Such vending machines are disclosed in U.S. Pat. Nos. 2,093,410; 2,253,482; and 2,385,465.

The prior art is aware of vending machines that serve soft ice cream. For example, U.S. Pat. No. 4,645,093 discloses a vending machine that includes a rack adapted to store empty styrofoam cups and a refrigerated box adapted to store ice cream. This vending machine removes the styrofoam cup from the rack and fills the cup with ice cream. Liquid and granular toppings are then added to the ice cream. Although it serves a parlor-quality ice cream, this vending machine has several drawbacks. For instance, soft ice cream is stored under conditions that require frequent cleaning. Such conditions result if the box is not thoroughly and regularly cleaned. Further, this vending machine can only serve a limited number of flavors of ice cream.

Mechanical failures are common with vending machines that refrigerate their products, especially with vending machines that employ motors or solenoids to dispense their products from the refrigerator. Because the motors and solenoids are located within the refrigerator, they are subjected to cold temperatures and condensates. Such harsh operating conditions increase the likelihood that the motors and solenoids will malfunction.

The large number of motors and solenoids employed in a standard vending machine also presents a drawback. Each bin in a vending machine typically has its own motor and solenoid. Each motor and solenoid adds to the manufacturing cost of the vending machine, as well as the maintenance and service costs.

SUMMARY OF THE INVENTION

The present invention relates to a novel vending machine for dispensing ice cream or yogurt. The vending machine vends cups filled with a primary food product and sealed with a cover. The vending machine includes storing means for storing the cups, first dispensing means for dispensing one cup from the storing means, removing means for removing the cover from the dispensed cup, second dispensing means for selectively adding at least one secondary food product to the primary food product in the dispensed cup, and controlling means for automatically controlling the first dispensing means, the removing means and the second dispensing means.

In the preferred embodiment of the present invention, the vending machine is adapted to vend cups of ice cream. The cups have frustum shapes. The cups of ice cream are stored sideways in a serpentine rack located within a freezer. The serpentine rack is divided into bins, with each bin storing a flavor of ice cream. To adapt the serpentine rack to store the frustum-shaped cups, a runner blade is located within each bin in order to elevate the conical axes of the cups to their horizontal positions. The cups are dispensed by spring-biased levers located at the bottom of the serpentine rack. By depressing a lever, the cup is dispensed from its corresponding bin, and jettisoned from the refrigerator though an access window.

A dispensing unit has a conveyor assembly, which includes a selector unit to depress a lever of a selected bin. The selector unit has a carriage which is positioned in front of the selected bin. A finger on the carriage depresses the lever of the selected bin, whereupon the dispensed cup falls from the refrigerator and onto the conveyor assembly. A centerwall and a sidewall on the conveyor assembly cooperate to orient the frustum-shaped cup in an upright position. The distance between the center and rear walls is greater than the diameter of the lower portion of the cup, but less than the diameter of the upper portion of the cup.

The conveyor assembly transports the dispensed cup to apparatus adapted to remove the cover from the cup. The apparatus includes a frame surrounding a rubber insert, and means for clamping the cup in place. As the frame is lowered to a horizontal position, an aperture located at the center of the rubber insert allows the rubber insert to get underneath the cover. Then, the frame is raised, whereby the rubber insert lifts the cover from the clamped cup. After the cup is uncovered, a stream of hot air softens the ice cream and melts the ice crystals.

The conveyor assembly then transports the cup to various stations at which toppings are added to the softened ice cream. The selections of ice cream flavor and toppings are entered into a keypad located on the front of the dispensing unit. The operation of the vending machine is controlled by a microprocessor.

BRIEF DESCRIPTION OF THE DRAWINGS

FIG. 5 is a detailed view of the lower portion of the refrigeration unit illustrated in FIG. 3;

FIG. 6 is a detailed view of the lower portion of the serpentine rack;

FIG. 9 is a perspective view of the conveyor assembly;

FIG. 11 is a cross-sectional view of a conveyor assembly, the cross section being taken along line 11—11 in FIG. 9 and looking in the direction of the arrows;

DETAILED DESCRIPTION OF THE EXEMPLARY EMBODIMENTS

Although the present invention may be used to dispense many different types of food products, it is especially suitable for dispensing frozen food products such as ice cream and yogurt. Accordingly, the present invention will be described in connection with an ice cream vending machine.

Figure 1:
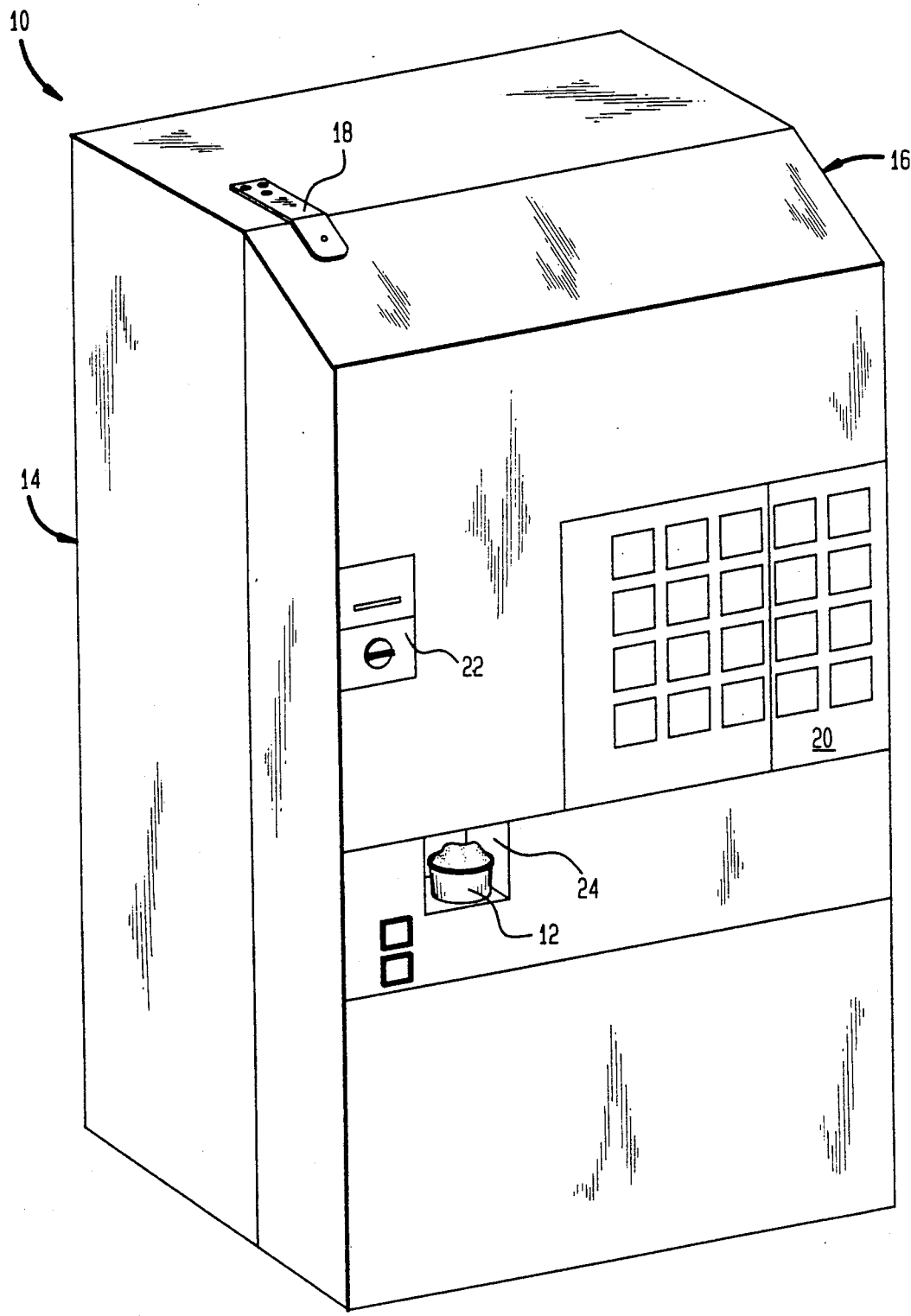
FIG. 1 is a perspective view of the front of an ice cream vending machine constructed in accordance with the present invention.

Referring now to FIG. 1, there is shown an ice cream vending machine 10 that dispenses a prepackaged cup 12 of frozen ice cream. The vending machine 10 includes a refrigeration unit 14 for storing the ice cream in a frozen state, and a dispensing unit 16 which functions to remove the cup 12 from the refrigeration unit 14, uncover the cup 12, heat the ice cream contained within the cup 12 and add toppings to the ice cream. The dispensing unit 16 is attached to the front of the refrigeration unit 14 by a hinge 18. A coin-operated control unit having a keypad 20 and a slot 22 is mounted on the front of the dispensing unit 16. The keypad 20 allows a customer (not shown) to select from various flavors of ice cream and a variety of toppings such as nuts, hot fudge and whipped cream. To operate the vending machine 10, a customer inserts change into the coin slot 22, and then enters his selection on the keypad 20. For example, the customer can select chocolate ice cream topped with peanuts and covered with whipped cream. The dispensing unit 16 removes a prepackaged cup 12 of chocolate ice cream from the refrigeration unit 14, and transports the cup 12 from the refrigeration unit 14 to an exit window 24 at the front of the dispensing unit 16, during which time the dispensing unit 16 uncovers the cup 12, heats the chocolate ice cream, tops the chocolate ice cream with peanuts and covers the peanuts and chocolate ice cream with whipped cream. Dispensed from the vending machine 10 is a cup 12 containing parlor-quality ice cream. An eating utensil, such as a spoon, can be dispensed along with the cup 12 or provided independently by such means as a basket.

Figure 2:
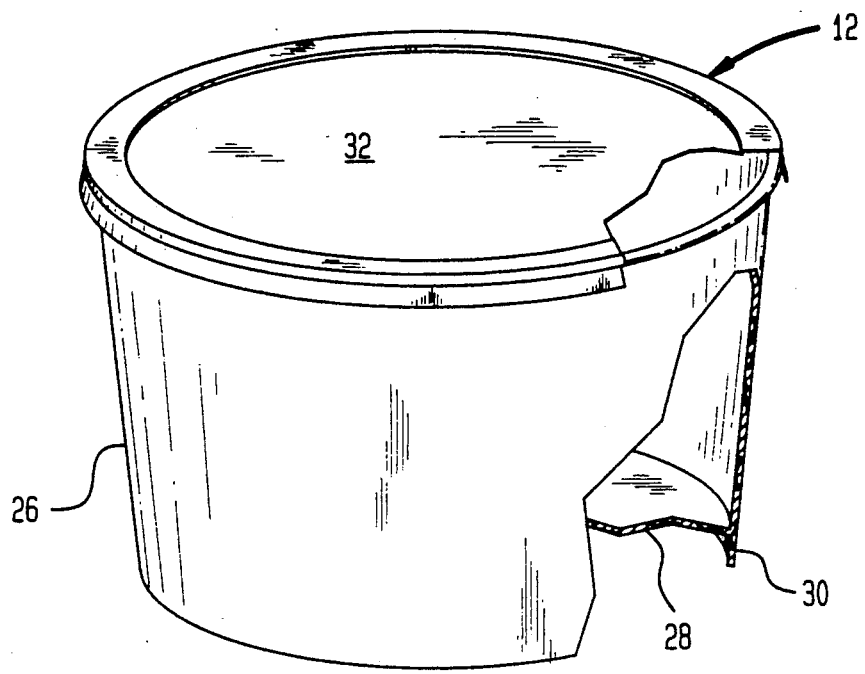
FIG. 2 is a perspective view of a cup dispensed by the vending machine illustrated in FIG. 1, a portion of the cup being removed for clarity.

Referring now to FIG. 2, there is shown a cup 12 that is dispensed from the preferred embodiment of the vending machine 10. The cup 12 has a body 26 that has the shape of a frustum. The end of the body 26 having the lessor diameter is closed to provide a base 28. A lip 30, the function of which will be described hereinafter, is formed around the base 28. A cover 32 is attached to the top of the body 26 to provide an air tight, sanitary seal for ice cream contained within body 26. The body 26 and cover 32 are made of a resilient material such as wax paper or plastic. The cup 12 of ice cream can be of the pre-packaged, store-bought type, which is well known to children and adults alike. The shape of the body 26 is not restricted to that of a frustum. For instance, the body 26 could have a cylindrical shape. However, in the preferred embodiment of the present invention, the frustum shape of the body 26 is integral to the operation of the vending machine 10, and therefore is required.

Figure 4:
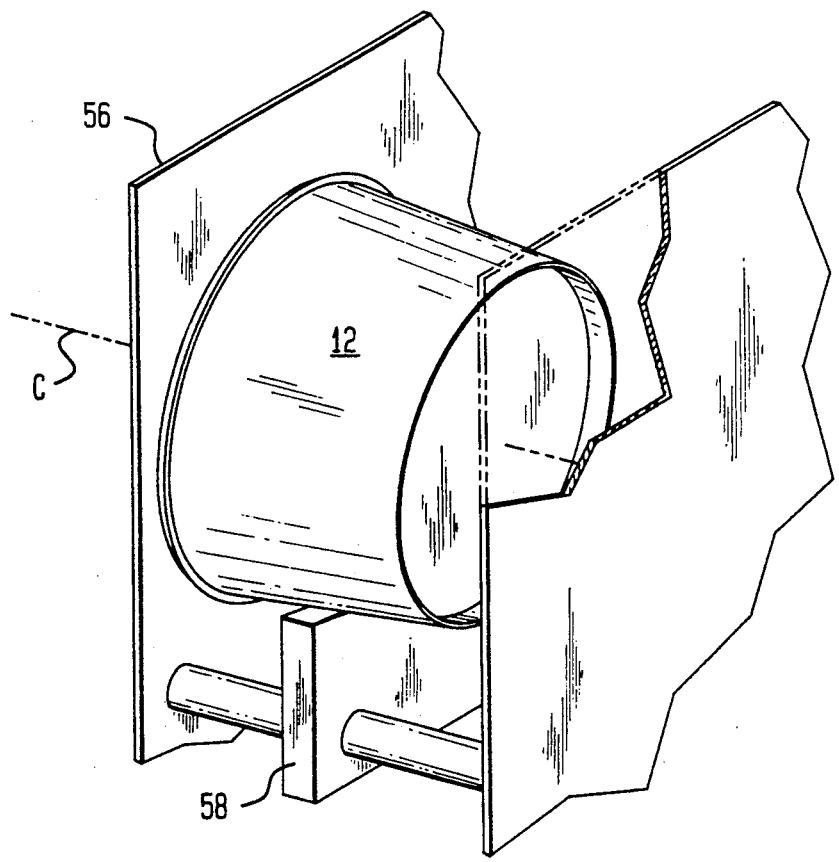
FIG. 4 is a detailed view of a section of a serpentine rack, which forms a part of the refrigeration unit illustrated in FIG. 3.
Figure 3:
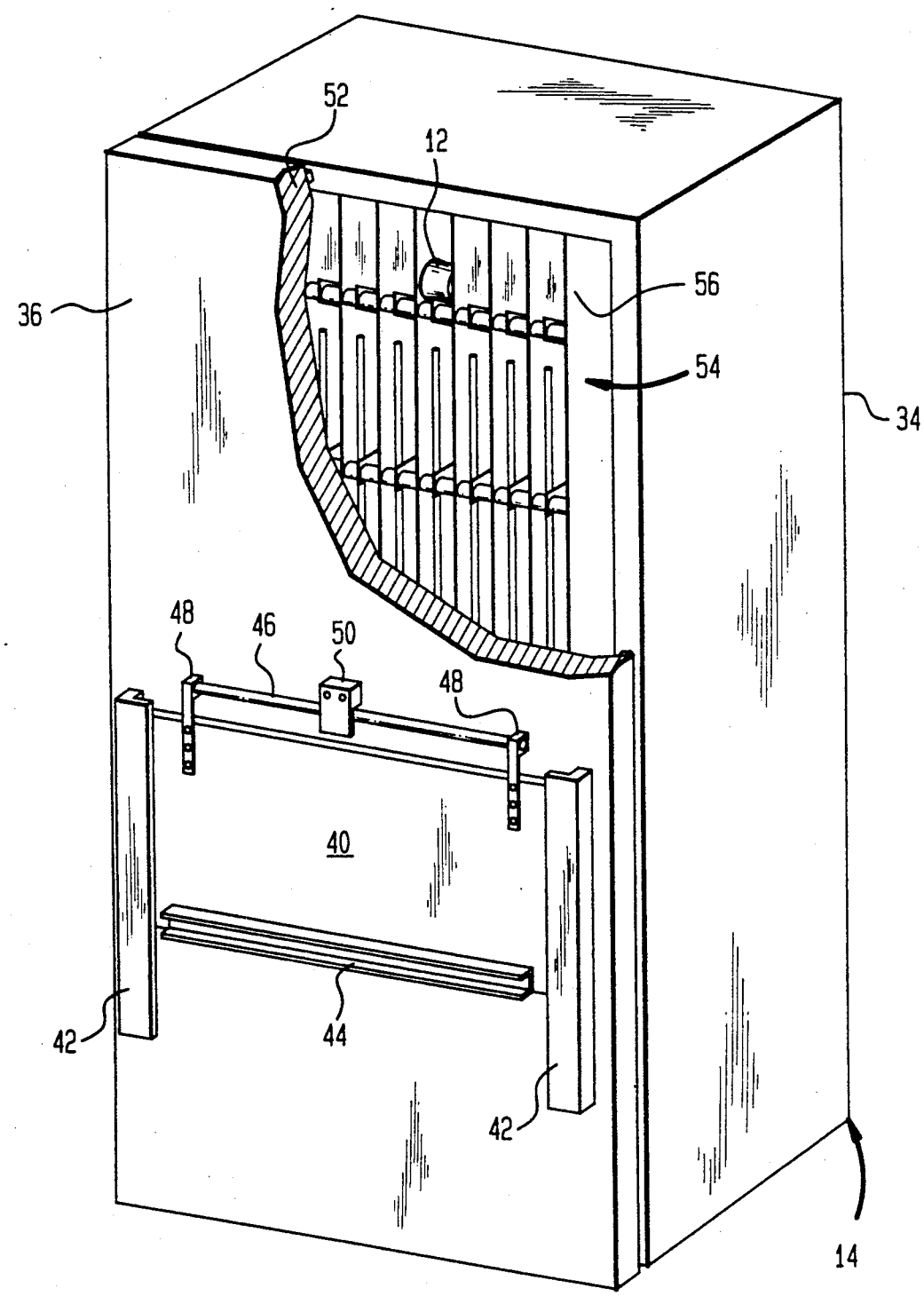
FIG. 3 is a perspective view of a refrigeration unit forming a part of the vending machine illustrated in FIG. 1, a portion of the refrigeration unit being removed for clarity.

Referring now to FIGS. 3-5, the refrigeration unit 14 includes a cabinet 34 and a door 36 hingedly attached to the front thereof. An access opening 38, located at the middle of the door 36, traverses the width of the door 36. A subdoor 40 is attached to the exterior surface of the door 36 by a pair of guide rails 42. The guide rails 42 allow the subdoor 40 to slide vertically between an "up" position and a "down" position. In its "up" position (FIG. 3), the subdoor 40 covers the access opening 38. When the subdoor 40 is in the "down" position (FIG. 5), the access opening 38 is completely uncovered. A rectangular channel 44, disposed horizontally, is attached to the subdoor 40. A bar 46 is attached to the subdoor 40 in a horizontal position thereabove by a pair of mounting flanges 48. The functions of the channel 44 and the bar 46 will be described hereinafter. A subdoor clamp 50 is attached to the door 36 above the access opening 38 and cooperates with the bar 46 to hold the subdoor 40 in its "up" position.

Cooling apparatus (not shown), located within the cabinet 34, functions to remove heat from the cabinet 34 in order to maintain a sub-freezing environment therein. The cooling capacity of the cooling apparatus and its location within the cabinet 34 can be determined by a person skilled in the art. To prevent heat from entering into the cabinet 34, the cabinet 34, door 36 and subdoor 40 are thermally insulated with a suitable material 52.

A serpentine rack 54, located within the cabinet 34, includes a plurality of bins 56 that store the cups 12. Although other types of racks may serve this storage function, serpentine racks 54 are most desirable. Serpentine racks 54 dispense the cups 12 by a gravity-feed system, which eliminates the need for an elaborate electric conveyor system, and they utilize storage space relatively efficiently. In the preferred embodiment of the present invention, the serpentine rack 54 must store frustum-shaped cups 12. However, serpentine racks 54 known to the prior art are not well-suited for dispensing objects that have frustum shapes. A frustum-shaped object has a natural tendency to roll in a circular path, and thereby jam against a wall of the bin 56. To adapt a prior art serpentine rack 54 to dispense the frustum-shaped cups 12, a runner blade 58 is located between the walls of each bin 56 to elevate the base 28 of each cup 12 such that the conical axis C is disposed horizontally.

Referring now to FIG. 6, the bottom of the serpentine rack 54 communicates with the access opening 38 to allow the cups 12 to be dispensed through the access opening 38. A spring-biased lever 60 is located at the bottom of each bin 56 such that it is accessible through the access opening 38. When the spring-biased lever 60 is depressed downward, one cup 12 is dispensed from the associated bin 56 and through the access opening 38. Such spring-biased levers 60 are well known to the prior art. However, any other functionally equivalent device may be used in its place. A plurality of flaps 62, each attached to a bin 56, actuate corresponding sealed switches (not shown) to indicate when their corresponding bins 56 are out of cups 12.

Figure 7:
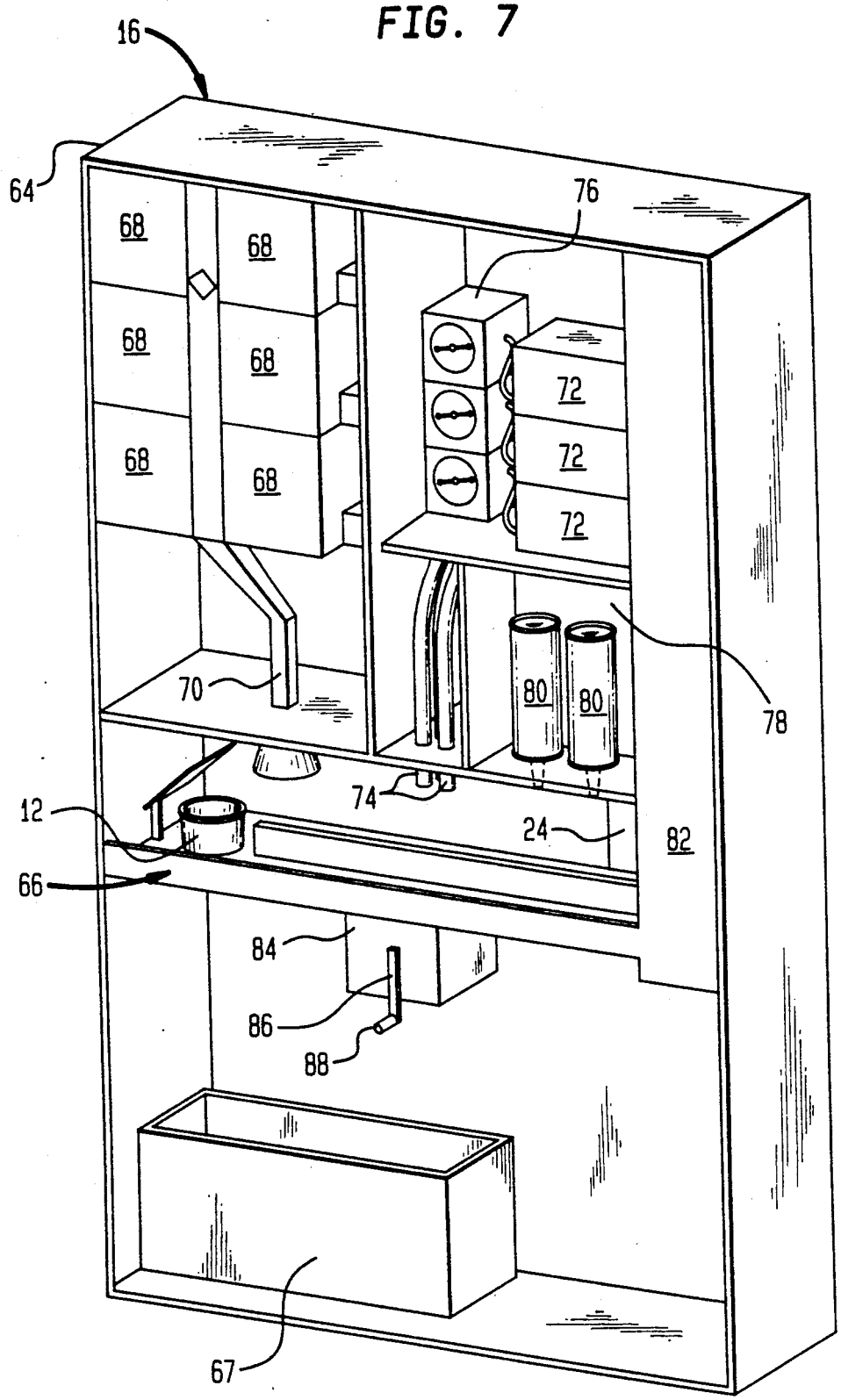
FIG. 7 is a perspective view of a dispensing unit, which forms a part of the vending machine illustrated in FIG. 1.

With reference to FIG. 7, the dispensing unit 16 includes a metal frame 64, which is divided into an upper half and a lower half by a conveyor assembly 66. During its operation, the conveyor assembly 66 removes a cup 12 from a selected bin 56 in the refrigeration unit 14, orients the cup 12 in an upright position, and transports the cup 12 to the exit window 24, during which time the cup 12 is uncovered, the ice cream in the cup 12 is heated, and granular and liquid toppings and whipped cream are added to the ice cream. The cover 32 removed from the cup 12 is dispensed into a box 67 located in the lower half of the frame 64.

Located in the upper half of the metal frame 64 are a plurality of hoppers 68 and corresponding augers (not shown), which are well known to the prior art. Each hopper 68 is adapted to store a particular type of granular topping, such as peanuts. The auger dispenses the granular topping from its corresponding hopper 68 into a common dispensing tube 70 which has a free end that terminates over the conveyor assembly 66. As a cup 12 passes under the common dispensing tube 70, the granular topping is directed onto the ice cream in the cup 12.

Also located in the upper half of the frame 64 are a plurality of plastic containers 72, which are adapted to store liquid toppings, such as chocolate fudge. From each plastic container 72 extends a discharge tube 74 having a free end that terminates over the conveyor assembly 66. The free ends of the discharge tubes 74 are kept in close proximity such that any one discharge tube 74 can dispense its liquid topping onto a cup 12 that passes underneath the plurality of discharge tubes 74. In the preferred embodiment of the present invention, the liquid toppings are discharged from their respective plastic containers 72 by peristaltic pumps 76. However, in alternate embodiments, the liquid toppings can be discharged by any known method, such as gravity feed, or by any known means. To heat a liquid topping prior to serving, a cartridge heater (not shown) can be inserted in the corresponding plastic container 72.

Also located in the upper half of the frame 64 is a refrigerated box 78 which stores a plurality of cans 80 of whipped cream. As a cup 12 passes underneath the refrigerated box 78, the cans 80 are moved such that whipped cream is dispensed therefrom and sprayed onto the cup 12. The movement of the cans 80 can be readily implemented by a person skilled in the art.

The control unit is also located in the upper half of the frame 64. The control unit includes the keypad 20, which is attached to the front of the dispensing unit 16 (see FIG. 1). The keypad 20 includes a plurality of momentary-contact switches (not shown) which correspond to the various selections available to the consumer. In the preferred embodiment, the contact switches are arranged into three groups: the first group corresponds to the available flavors of ice cream; the second group corresponds to the available granular toppings; and the third group corresponds to the available liquid toppings. Furthermore, the control unit of the preferred embodiment is coin-operated. A coin mechanism 82 enables the vending machine 10 to operate whenever the proper amount of change is inserted into the coin slot 22 (see FIG. 1). In an alternate embodiment, a dollar bill validator is used in place of the coin mechanism 82. Such coin mechanisms 82 and dollar bill validators are well known to the prior art.

A motor 84, attached to the underside of the conveyor assembly 66, rotates a crank 86. The crank 86 has a pin 88 at its free end, which communicates with the channel 44 on the subdoor 40 (see FIG. 4). The crank 86, pin 88 and channel 44 convert the rotary motion of the motor 84 to a linear motion which moves the subdoor 40. One-half revolution of the motor 84 moves the subdoor 40 from its "up" position to its "down" position, and another half-revolution moves the subdoor 40 from its "down" position to its "up" position. The motor 84 is equipped with reduction gears to reduce the angular velocity of the crank 86 and to increase the force applied to the channel 44.

Figure 8:
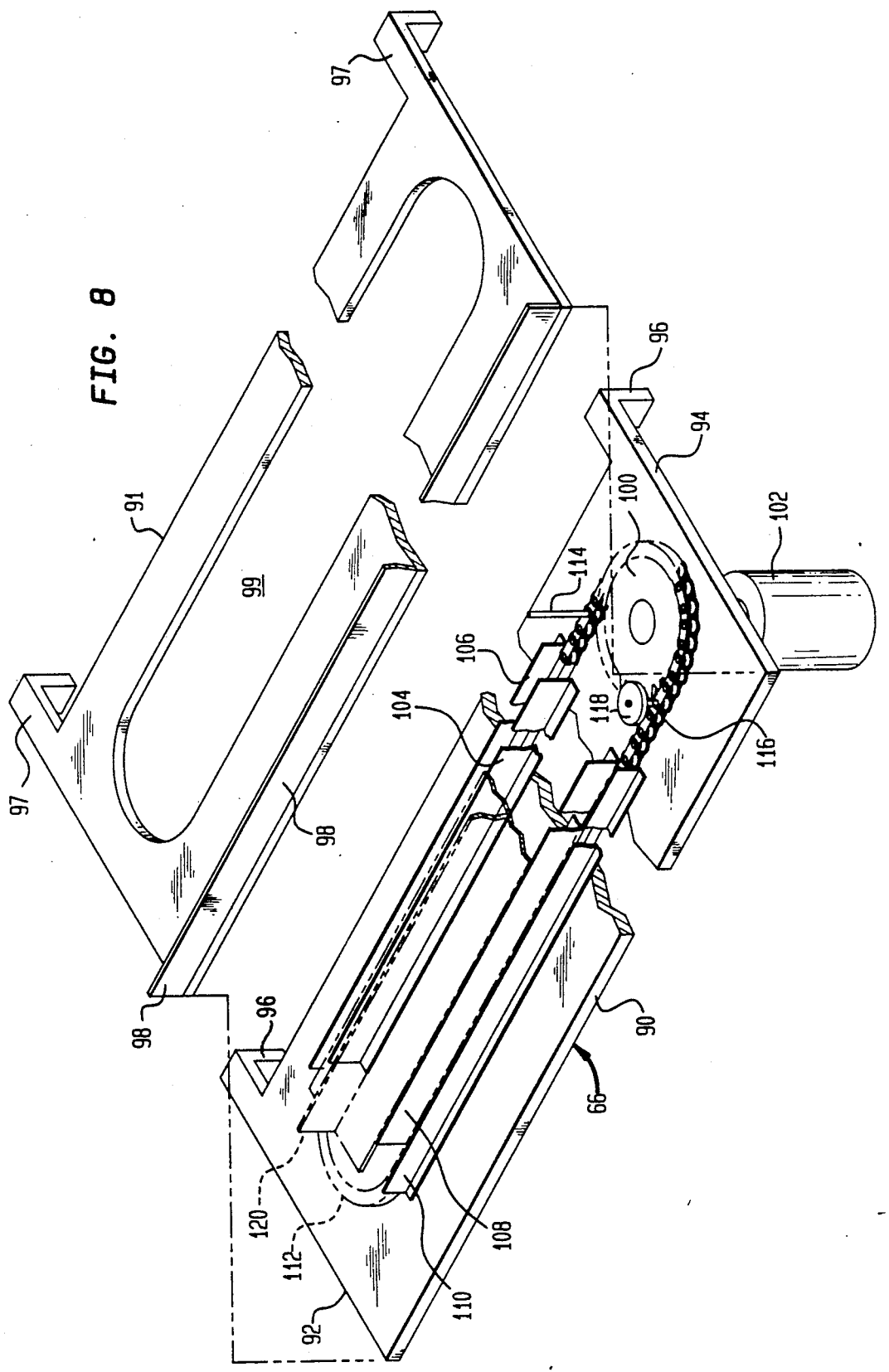
FIG. 8 is a perspective view of a conveyor assembly, which forms a part of the dispensing unit illustrated in FIG. 7, the center wall being shown in phantom.

Referring now to FIG. 8, the conveyor assembly 66 has opposing first and second ends 92 and 94 and includes a lower floor 90. A pair of first mounting flanges 96 depend from one side of the lower floor 90. A sprocket 100 is mounted to the upper surface of the lower floor 90 at the second end 94 thereof and is rotated by a motor 102 which is rigidly attached to the underside of the lower floor 90. The motor 102, equipped with reduction gears, can rotate the sprocket 100 to within ±5 degrees. A first pair of high and low inner walls 104 and 106, respectively, are attached to the lower floor 90 such that they form a channel along the side near the first mounting flanges 96. A second pair of high and low inner walls 108 and 110, respectively, are attached to the lower floor 90 such that they form a channel along the side opposite the first mounting flanges. The high inner walls 104 and 108 oppose each other, and, for reasons that will become apparent, are shorter in length than their respective low inner walls 106 and 110. The inner walls 104, 106, 108 and 110 function to guide a link chain 112, which engages the sprocket 100. First and second pins 114 and 116 extend upwards from the chain 112, with a washer 118 being attached to the free end of the second pin 116. The spatial relationship on the chain 112 between the first and second pins 114 and 116 and the height and functions of the pins 114 and 116 and washer 118 will be described hereinafter.

An upper floor 91 has a pair of second mounting flanges 97 attached to one side, and a sidewall 98 attached to the opposite side. An oval-shaped aperture 99, located on the upper floor 91, has the same shape and dimensions as the exterior of the chain 112. The conveyor assembly 66 is attached to the frame 64 by the first and second mounting flanges 96 and 97. The upper floor 91 is positioned above the lower floor 90, with the aperture 99 communicating with the chain 112.

A center wall 120 having an inverted T-shape is attached to the high inner walls 104 and 108 such that the floor of the "T" is at the same level as the upper floor 91. In the preferred embodiment of the present invention, the frustum shape of the body 26 cooperates with the center wall 120 and the sidewall 98 to orient the cup 12 in an upright position. The distance between the center wall 120 and the sidewall 98 must be greater than the diameter of the lower portion of the body 26, but less than the diameter of the upper portion of the body 26. When a cup 12 rolls out of the bin 56, it falls onto the conveyor assembly 66, whereupon the sidewall 98 and center wall 120 capture the upper portion of the body 26 and allow the lower portion of the body 26 to swing downward, thereby placing the cup 12 in an upright position. After the cup 12 is oriented in an upright position, the first pin 114 engages the cup 12 and pushes it towards the first end 92 of the conveyor assembly 66.

Referring now to FIG. 9, cover removal apparatus 124, located at the first end 92 of the conveyor assembly 66, functions to uncover the cup 12. This function can be implemented in a variety of ways, depending upon the manner in which the cup 12 is sealed. The cover removal apparatus 124 shown in FIG. 9 is employed for a cup 12 that is sealed with a cover 32. A curved insert 122, attached to the first end 92 of the conveyor assembly, guides the cup 12 around the center wall 120 and redirects it towards the second end 94 of the conveyor assembly 66.

Five microswitches (not shown) are located along the conveyor assembly 66. The first microswitch is actuated when the cup 12 is positioned in front of the cover removal apparatus 124. Second, third and fourth microswitches are actuated when the cup 12 passes under the common tube 70, the discharge tubes 74 and the whipped cream cans 80, respectively. The fifth microswitch is actuated when the cup 12 arrives at the exit window 24. Actuation of any microswitch causes the motor 102 to stop rotating for a predetermined period of time, during which time the cup 12 is held stationary. Operations occurring during these predetermined time delays will be discussed hereinafter.

Figure 10A:
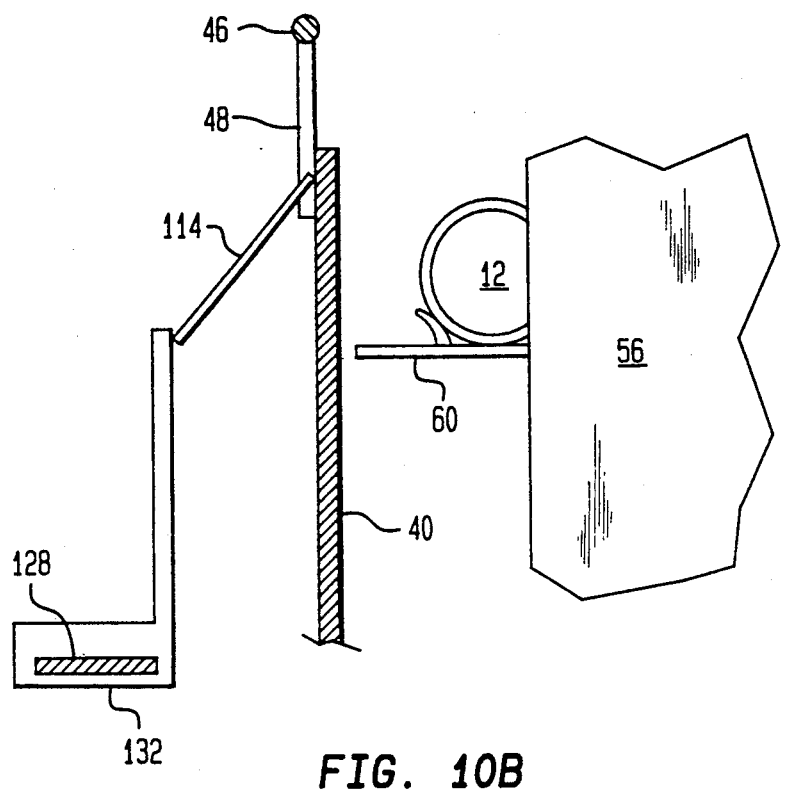
FIGS. 10A and 10B are schematic views of a cup being dispensed from the serpentine rack.
Figure 10B:
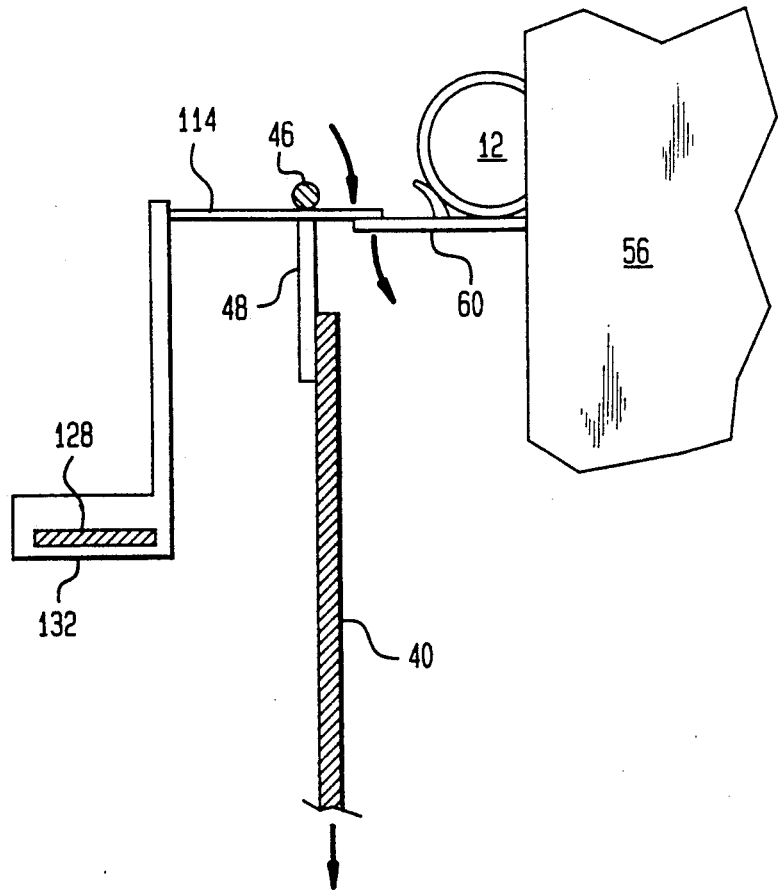

A selector unit 126 functions to depress the lever 60 of a bin 56 containing the flavor of ice cream chosen by the customer. The selector unit 126 includes a rail 128 which is attached rigidly to the lower floor 90 beneath the sidewall 98. A plurality of apertures 130 are provided on the rail 128 such that each aperture 130 corresponds to a bin 56 on the serpentine rack 54. A carriage 132 is adapted to slide along the rail 128. The carriage 132 contains a detector 134 which is adapted to determine whether the carriage 132 is aligned with an aperture 130 on the rail 128. The detector 134 can be an infrared sensor or any other equivalent device. By counting the number of apertures 130 detected by the detector 134, the carriage 132 can be positioned in front of the selected bin 56. A finger 136 is pivotally attached to the carriage 132 and extends outwardly therefrom. When the subdoor 40 is in the "up" position, the finger 136 rests on the subdoor 40 (see FIG. 10A). When the subdoor 40 is lowered, the finger 136 engages with the lever 60 of the desired bin 56. The subdoor 40 is lowered until the bar 46 depresses the finger 136 and the lever 60, thereby causing a cup 12 to be released from the desired bin 56 (see FIG. 10B).

Figure 12:
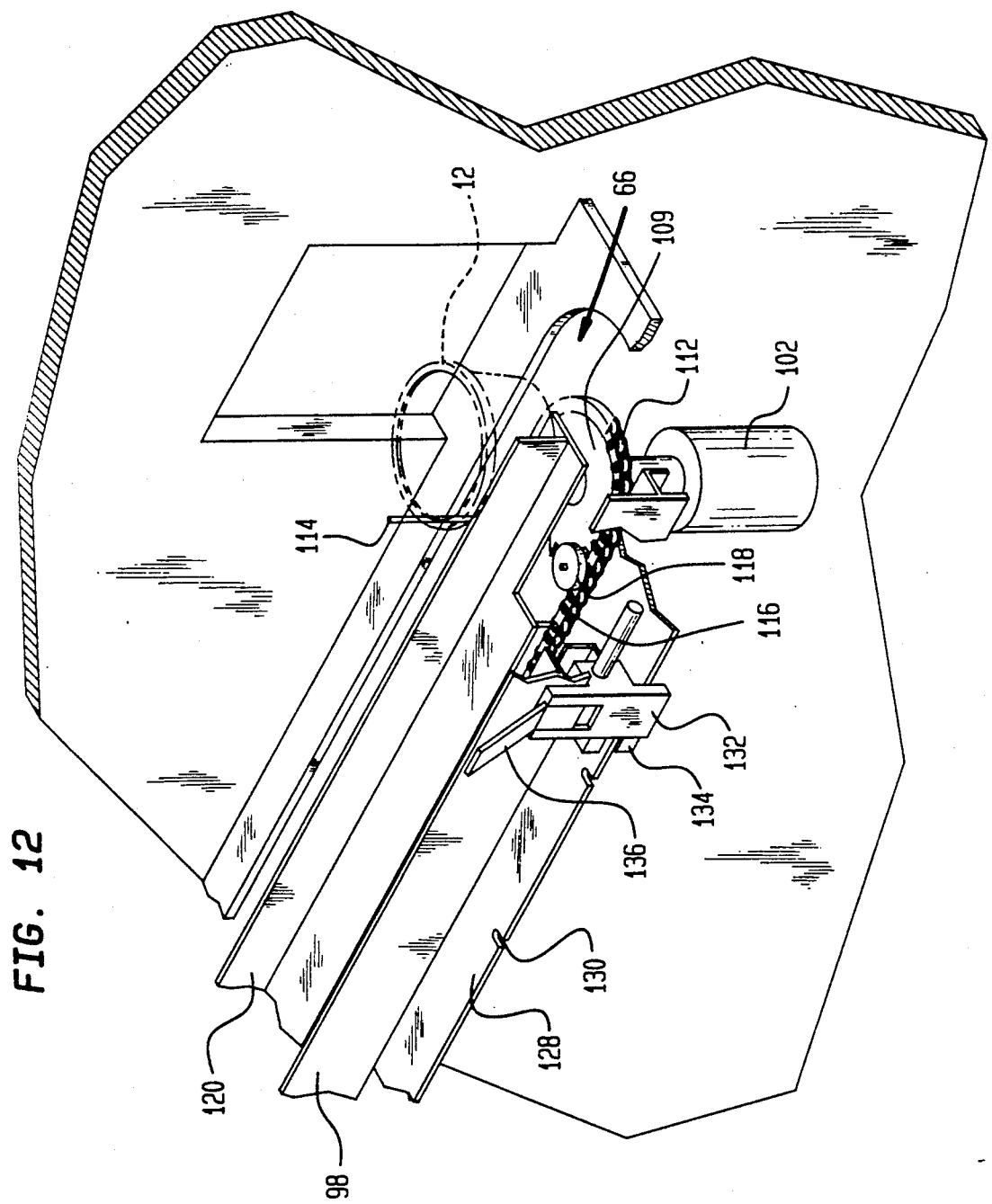
FIG. 12 is a perspective view of a selector unit, the selector unit forming a part of the conveyor illustrated in FIG. 9.

Referring now to FIGS. 11–12, an extension bar 138 is attached to the carriage 132 such that it runs underneath the lower floor 90 and runs parallel to the low inner wall 106. A stop member 140 is attached to the free end of the extension bar 138 and extends over the low inner wall 106. When the washer 118 rides along the low inner wall 110, it engages the carriage 132 and, as a result, slides the carriage 132 along the rail 128 towards the first end 92 of the conveyor assembly 66. When the washer 118 rides along the low inner wall 106, it engages the stop member 140 and, as a result, slides the carriage towards the second end 94 of the conveyor assembly 66.

Figure 13:
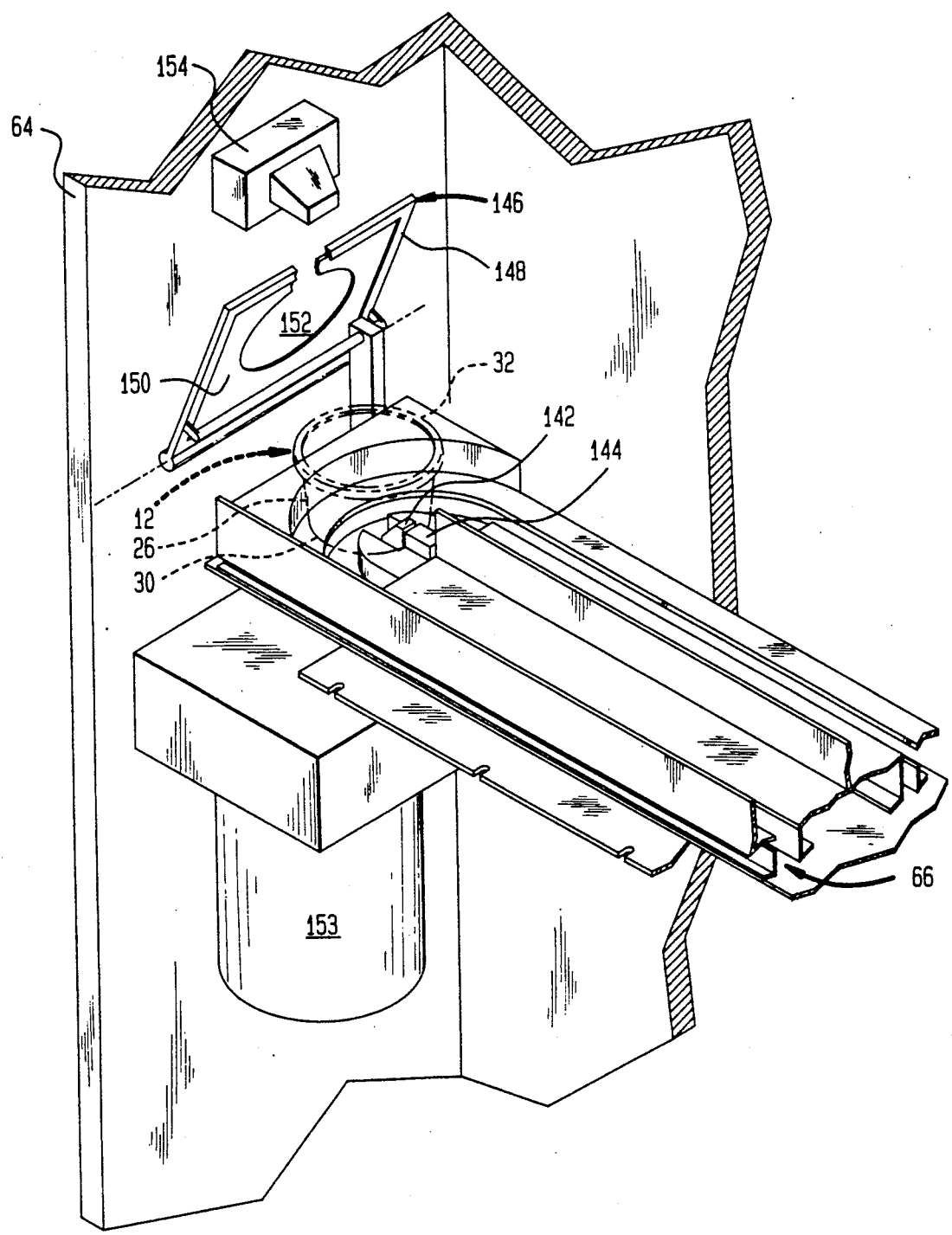
FIG. 13 is a perspective view of cover removal apparatus, which forms a part of the conveyor illustrated in FIG. 9.

Referring now to FIG. 13, the cover removal apparatus 124 includes a jaw 142 and palate 144. The palate 144 is rigidly attached to the lower floor 90. The jaw 142 is attached to the lower floor 90 such that it pivots from a retracted position in which the entire jaw 142 is below the surface of the lower floor 90 to an extended position in which the jaw 142 cooperates with the palate 144 to clamp the lip 30 of the cup 12 therebetween. Knurling (not shown) is placed on the inner surface of the jaw 142 to increase the clamping strength. The cover removal apparatus 124 also includes a swing arm 146 which is attached above the upper floor 91 such that it pivots between a vertical position and a horizontal position. The swing arm 146 has a rectangular frame 148 which surrounds a rubber insert 150. At the center of the rubber insert 150 is an aperture 152 which has a diameter that is slightly less than the diameter of the cover 32.

With the cup 12 positioned below the swing arm 146, the jaw 142 is moved to its extended position, thereby clamping the lip 30 to the lower floor 90. As the frame 148 moves to its horizontal position, the rubber insert 150 passes over the cover 32, and the aperture 152 enlarges and thereafter surrounds the body 26. With the swing arm 146 in its horizontal position, the rubber insert 150 is positioned beneath the cover 32. By raising the swing arm 146 to its vertical position, the cover 32 is lifted from the body 26. Thus, it is apparent that the rubber insert 150 must be sufficiently rigid to lift the cover 32 off the body 26, and yet sufficiently flexible to allow the aperture 152 to enlarge. The positions of the swing arm 146 and the jaw 142 must be synchronized such that the jaw 142 is in its fully extended position while the cover 32 is being lifted from the cup 12. In the preferred embodiment, a single motor 153 is equipped with cams that synchronize the relative motions of the jaw 142 and the swing arm 146. In an alternate embodiment, synchronization can be achieved by operating the jaw 142 and swing arm 146 from two separate motors.

Still referring to FIG. 13, a heater 154 is attached to the metal frame 64 above the swing arm 146. After the cover 32 is removed from the cup 12, the heater 154 ejects a stream of hot air onto the ice cream in the cup 12. The hot air softens the ice cream. The temperature of the hot air and the duration required to melt the ice cream can be determined by a person skilled in the art. In alternate embodiments, the heater 154 can utilize steam or microwave radiation to soften the ice cream.

The operation of the ice cream vending machine 10 is controlled by a microprocessor. The selection of a particular type of microprocessor is left to those skilled in the art. Furthermore, the general principles of construction of microprocessors are well known to those skilled in the art, and, apart from their specific application to provide control called for by the present invention, are not described in detail herein.

Prior to operating the ice cream vending machine 10, cups 12 containing different flavors of ice cream are loaded in separate bins 56. For example, cups 12 of chocolate ice cream are stored in the first two bins; cups 12 of vanilla ice cream are stored in the next two bins; cups 12 of strawberry ice cream are stored in the next two bins; etc. The microprocessor must be programmed to correlate the bins 56 with the flavors of ice cream.

The ice cream vending machine 10 operates as follows. A customer inserts the correct amount of change into the coin slot 22 and selects his options from the keypad 20. Assume that the customer selects chocolate ice cream topped with peanuts, chocolate syrup and whipped cream. The microprocessor determines that the second bin (BIN 2) contains chocolate ice cream, and then actuates the motor 102, which rotates the sprocket 100 and chain 112. As the chain 112 rotates, the second pin 116 and washer 118 abut against the carriage 132, thereby causing the carriage 132 to slide along the rail 128. As the carriage 132 slides along the rail 128, the microprocessor keeps a running count of the apertures 130 detected by the detector 134. When the count equals two, the microprocessor stops the chain 112 from rotating, leaving the carriage 132 positioned in front of BIN 2. The microprocessor commands the crank 86 to rotate by one-half revolution, thereby moving the subdoor 40 to its "down" position. As the subdoor 40 moves downward, the finger 136 on the carriage 132 engages the lever 60 on BIN 2. As the subdoor 40 continues moving downward, the bar 46 depresses the finger 136, which depresses the lever 60 and thereby releases a cup 12 of chocolate ice cream from BIN 2. The cup 12 dispensed from BIN 2 hits center wall 120 which, in cooperation with the sidewall 98, captures upper part of body 26. The base 28 of the cup 12 swings downward and orients the cup 12 in the upright position. The microprocessor then commands the crank 86 to rotate another half-revolution, thereby moving the subdoor 40 to its "up" position, and simultaneously advances the chain 112. The carriage 132 continues sliding down the rail 128 until the washer 118 disengages the carriage 132. As the chain 112 continues rotating, the first pin 114 on the chain 112 abuts against the cup 12 and pushes the cup 12 towards the first end 92 of the conveyor assembly 66. As the cup 12 arrives at the first end 92 of the conveyor assembly 66, a microswitch is actuated, whereupon the chain 112 is stopped. The microprocessor then commands the jaw 142 to its extended position and the swing arm 146 to its horizontal position. The swing arm 146 is then commanded to its vertical positions, whereupon the cover 32 is lifted from the cup 12. The cover 32 is dispensed into the box 67 located in the lower half of the dispensing unit 16. Next, the heater 154 is commanded to eject a stream of hot air onto the ice cream for a brief interval, causing the ice cream to melt. After the ice cream is softened, the microprocessor commands the jaw 142 to its retracted position, and continues advancing the chain 112. The cup 12 continues moving along the conveyor assembly 66 until it actuates the microswitch located beneath the common tube 70, at which point the microprocessor stops the chain 112. Then, the microprocessor actuates the auger corresponding to the selected topping, in this case peanuts. Peanuts are directed by the common tube 70 onto the stationary cup 12. After the auger is deactuated, the microprocessor continues advancing the chain 112 until the cup 12 actuates the microswitch located below the discharge tubes 74. With the cup 12 positioned beneath the discharge tubes 74, the microprocessor actuates the peristaltic pump 76 corresponding to the chocolate syrup. After chocolate syrup is dispensed onto the ice cream, the microprocessor advances the chain 112, until the cup 12 actuates the microswitch located below the refrigerated box 78. With the cup 12 located beneath the refrigerated box 78, the microprocessor commands the cans 80 to discharge whipped cream onto the ice cream. After whipped cream is discharged onto the ice cream, the cup 12 is advanced along the lower floor 90 until the cup 12 actuates the microswitch located at the exit window 24, whereby the finished product, a cup 12 of soft chocolate ice cream, covered with peanuts and chocolate syrup and topped with whipped cream, is delivered to the customer.

It will be understood that the embodiment described herein is merely exemplary and that a person skilled in the art may make many variations and modifications without departing from the spirit and scope of the invention. All such modifications are intended to be included within the scope of the invention as defined in the appended claims.

I claim:

1. Apparatus for vending a plurality of cups, each cup being filled with a primary food product and sealed with a cover, said apparatus comprising:

storing means for storing the plurality of cups;

first dispensing means for dispensing one cup of said plurality of cups from said storing means;

removing means for removing the cover from said one cup;

second dispensing means for selectively adding at least one secondary food product to the primary food product in said one cup; and controlling means for automatically controlling said first dispensing means, said removing means and said second dispensing means.

2. Apparatus according to claim 1, wherein said storing means includes a plurality of bins.

3. Apparatus according to claim 2, wherein said storing means is a serpentine rack.

4. Apparatus according to claim 2, wherein said plurality of bins are enclosed in a cabinet, but are accessible to said first dispensing means.

5. Apparatus according to claim 4, wherein said first dispensing means includes means for selectively and monotonically releasing one cup from a selected one of said plurality of bins.

6. Apparatus according to claim 5, wherein said selective releasing means includes:

discharging means, located at the bottom of each bin, for releasing one cup at a time from said bin;

selecting means for selecting a bin from which a cup is released; and actuating means, attached to said selecting means, for actuating said discharging means of said selected bin, whereby a cup is released from said selected bin.

7. Apparatus according to claim 6, wherein said selecting means includes a rail perforated with apertures, a carriage adapted to slide along said rail, and detecting means attached to said carriage for detecting the presence of said apertures, said apertures indicating the position of the carriage relative to the bins.

8. Apparatus according to claim 7, wherein said detecting means includes an infrared sensor.

9. Apparatus according to claim 7, wherein said discharging means includes a lever, and wherein said discharging means is actuated by depressing said lever.

10. Apparatus according to claim 9, wherein said actuating means includes a finger pivotally attached to said carriage for engaging said lever, and depressing means for depressing said finger.

11. Apparatus according to claim 10, wherein said cabinet has an access window through which said finger can communicate with said discharging means, and a subdoor that slides between a first position in which said access window is covered and a second position in which said access window is uncovered, and wherein said depressing means is a bar attached to said subdoor, wherein as said subdoor is moved from said first position to said second position, said bar depresses said finger, whereby a cup is released from said selected bin.

12. Apparatus according to claim 1, wherein said storing means stores each cup of said plurality in a non-upright position, and wherein said first dispensing means further comprises orienting means for orienting said one cup in an upright position.

13. Apparatus according to claim 12, wherein each cup has a frustum shape, and wherein said orienting means includes first and second walls which cooperate to form a channel therebetween, the distance between said first and second walls falling between the diameters of the respective ends of said one cup.

14. Apparatus according to claim 13, wherein said one cup is dispensed into said channel.

15. Apparatus according to claim 1, wherein said removing means includes clamping means for clamping said one cup, gripping means for gripping the cover of said one cup and lifting means for lifting said gripping means away from said one cup, whereby said cover is removed from said one cup.

16. Apparatus according to claim 15, wherein each cup of said plurality has a lip formed around its base, and wherein said clamping means includes a palate and a retractable jaw, said palate and retractable jaw cooperating to clamp said lip therebetween.

17. Apparatus according to claim 15, wherein said gripping means includes a rubber diaphragm having a central aperture, said aperture having a diameter that is slightly less than the diameter of the cover of said one cup, and wherein said lifting means includes a frame surrounding said rubber diaphragm, said frame being movable between a horizontal position and a vertical position.

18. Apparatus according to claim 15, wherein said removing means further includes means for collecting said removed cover.

19. Apparatus according to claim 1, wherein said second dispensing means includes first adding means for selectively adding granular food products.

20. Apparatus according to claim 19, wherein said first adding means includes a hopper and auger.

21. Apparatus according to claim 19, wherein said second dispensing means includes second adding means for selectively adding liquid food products.

22. Apparatus according to claim 21, wherein said second adding means includes a storage container for storing the liquid food product and supplying means for supplying the liquid food product from said storage container to said one cup.

23. Apparatus according to claim 21, wherein said second adding means further includes means for heating said liquid food product.

24. Apparatus according to claim 19, wherein said second dispensing means further includes means for selectively adding whipped cream to said one cup.

25. Apparatus according to claim 1, wherein said second dispensing means can selectively add a plurality of secondary food products to said one cup.

26. Apparatus according to claim 1, wherein said controlling means includes a microprocessor.

27. Apparatus according to claim 1, wherein said controlling means includes a money-activated switch means.

28. Apparatus according to claim further comprising conveying means for conveying said one cup between said storing means, said removing means and said second dispensing means, said conveying means being controlled by said controlling means.

29. Apparatus according to claim 1, wherein said food product is a frozen food product.

30. Apparatus according to claim 29, wherein said storing means is refrigerated.

31. Apparatus according to claim 29, further comprising means for heating said frozen food product, said heating means being controlled by said controlling means.

32. Apparatus according to claim 31, wherein said heating means ejects a stream of hot air onto said frozen food product.

33. Apparatus according to claim 31, wherein said heating means ejects steam onto said frozen food product.

34. Apparatus according to claim 31, wherein said heating means focuses microwave radiation onto said frozen food product.

35. Apparatus according to claim 1, further comprising housing means for housing said storing means, said first dispensing means, said removing means and said second dispensing means.

36. Apparatus according to claim 1, further comprising providing means for providing utensils.

* * * * *

UNITED STATES PATENT AND TRADEMARK OFFICE
CERTIFICATE OF CORRECTION

PATENT NO. : 5,027,698
DATED : July 2, 1991
INVENTOR(S) : Munroe Chirnomas

It is certified that error appears in the above-identified patent and that said Letters Patent is hereby corrected as shown below:

```
Column 12, line 12, after "claim",
insert --1--.
```

Signed and Sealed this

Nineteenth Day of July, 1994

Attest:

BRUCE LEHMAN

*Attesting Officer*    *Commissioner of Patents and Trademarks*